United States Patent
Bonkowski et al.

(10) Patent No.: US 11,673,599 B2
(45) Date of Patent: Jun. 13, 2023

(54) AXIALLY ADJUSTABLE STEERING COLUMN ASSEMBLY

(71) Applicant: Steering Solutions IP Holding Corporation, Saginaw, MI (US)

(72) Inventors: Jeremy A. Bonkowski, Freeland, MI (US); Jeremy M. Zemla, Owosso, MI (US); Scott A. Stinebring, Auburn, MI (US); Patrik M. Ryne, Lake Orion, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/531,862

(22) Filed: Nov. 22, 2021

(65) Prior Publication Data

US 2022/0161842 A1 May 26, 2022

Related U.S. Application Data

(60) Provisional application No. 63/117,108, filed on Nov. 23, 2020.

(51) Int. Cl.
*B62D 1/185* (2006.01)
*B62D 1/181* (2006.01)

(52) U.S. Cl.
CPC ............. *B62D 1/185* (2013.01); *B62D 1/181* (2013.01)

(58) Field of Classification Search
CPC .................................. B62D 1/185; B62D 1/181
See application file for complete search history.

(56) References Cited

U.S. PATENT DOCUMENTS

| | | | |
|---|---|---|---|
| 7,159,904 B2* | 1/2007 | Schafer | B62D 1/181 280/775 |
| 9,260,130 B2* | 2/2016 | Mizuno | B62D 1/187 |
| 10,640,139 B2 | 5/2020 | Derocher et al. | |
| 10,661,819 B2 | 5/2020 | Heitz et al. | |
| 10,974,756 B2* | 4/2021 | Cana | B62D 1/181 |
| 11,358,626 B2* | 6/2022 | Ryne | B62D 1/185 |
| 11,390,313 B2* | 7/2022 | Kurokawa | B62D 1/192 |
| 2009/0100956 A1* | 4/2009 | Warashina | B62D 1/181 74/493 |
| 2012/0247259 A1* | 10/2012 | Mizuno | B62D 1/181 74/493 |
| 2017/0120944 A1* | 5/2017 | Kato | B62D 1/181 |
| 2019/0225255 A1* | 7/2019 | Ishimura | B62D 1/185 |
| 2019/0322307 A1* | 10/2019 | Kwon | B62D 1/181 |
| 2021/0061340 A1* | 3/2021 | Wilkes | B62D 1/185 |
| 2021/0129894 A1* | 5/2021 | Ryne | B60K 37/06 |

* cited by examiner

Primary Examiner — Drew J Brown
(74) Attorney, Agent, or Firm — Dickinson Wright PLLC

(57) ABSTRACT

In accordance with one aspect of the invention, a steering column assembly is provided. The steering column assembly comprises a steering column extending along a longitudinal axis between a first end and a second end. The steering column includes a lower portion extending from the second end, a middle portion connected to and axially moveable with respect to the lower portion, and an upper portion connected to and axially moveable with respect to the middle portion and extending towards the first end. A component is connected to the steering column adjacent to the lower portion and at least one axial actuator is connected between the component and the upper portion.

13 Claims, 6 Drawing Sheets

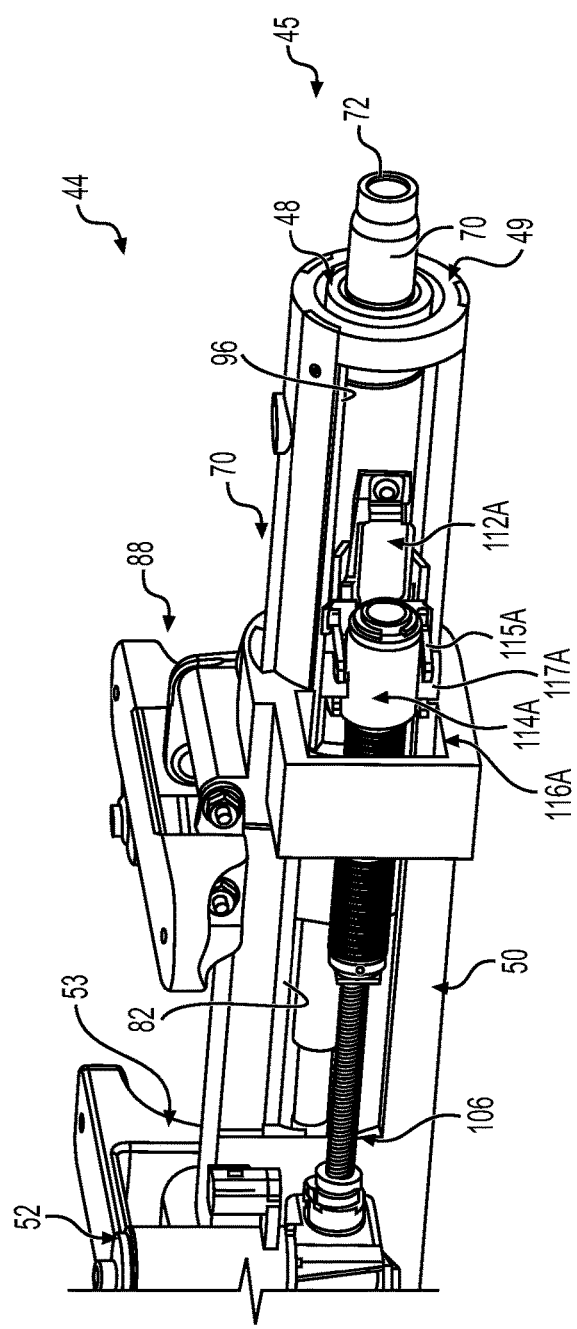
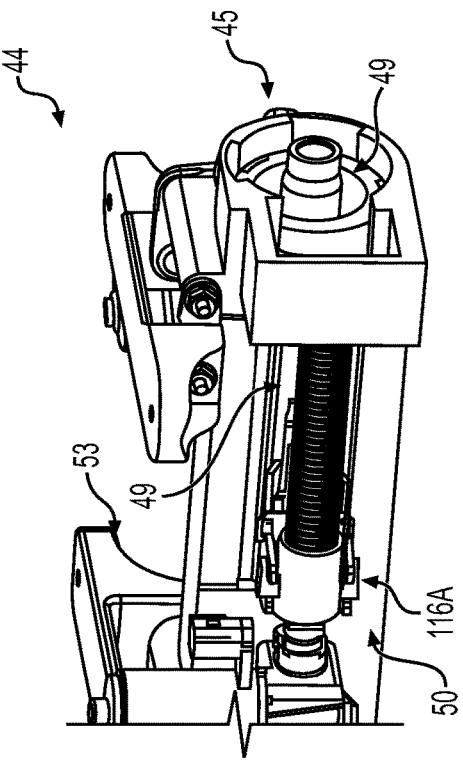

AXIALLY ADJUSTABLE STEERING COLUMN ASSEMBLY

CROSS REFERENCE TO RELATED APPLICATION

This U.S. Utility Patent Application claims the benefit of and priority to U.S. Provisional Patent Application Ser. No. 63/117,108 filed on Nov. 23, 2020 entitled "System, Method and Apparatus for a Telescopic Actuator for a Steering Column," the entire disclosure of the application being considered part of the disclosure of this application and hereby incorporated by reference.

BACKGROUND

1. Field of Invention

The embodiments described herein relate to vehicle steering systems and, more particularly, to a steering column assembly that permits axial movement between two or more axially adjustable parts.

2. Related Art

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned further away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode. For a significantly greater amount of telescopic and stow capacity, conventional steering column solutions will not package between the rear of dash and the front of dash for any normal passenger vehicle.

Conventional solutions also have other limitations. Power axially adjustable steering columns typically have at least one axial actuator connected to two or more telescopic jackets. In some instances these power axially adjustable steering columns also include rake actuators that permit tilt movement around one or more pivot points. Telescopic steering columns with both rake and axial movement can even further increase the amount of space required by the steering column assembly to operate in the underlying structure as the axial actuator typically needs to travel to some degree with rake movement. Additionally, the rake adjustment actuator typically requires additional energy expenditure for carrying the weight of the axial actuator on the telescopic jackets in addition to other components of the steering column. The increased weight on the pivot point and jacket can result in unnecessary operational wear and tear.

Accordingly, as some end use applications are actually decreasing the space available for steering column assemblies, the existing telescopic solutions are becoming an issue. Thus, improvements in the compact adjustment of steering columns continue to be of interest.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

In accordance with one aspect of the invention, a steering column assembly is provided. The steering column assembly comprises a steering column extending along a longitudinal axis between a first end and a second end. The steering column includes a lower portion extending from the second end, a middle portion connected to and axially moveable with respect to the lower portion, and an upper portion connected to and axially moveable with respect to the middle portion and extending towards the first end. A component is connected to the steering column adjacent to the lower portion and at least one axial actuator is connected between the component and the upper portion.

In accordance with another aspect of the invention, a steering column assembly is provided. The steering column assembly comprises a steering column extending along a longitudinal axis between a first end and a second end. The steering column includes a lower portion extending from the second end, a middle portion connected to and axially moveable with respect to the lower portion, and an upper portion connected to and axially moveable with respect to the middle portion and extending towards the first end. A lower mounting bracket is connected to the steering column adjacent to the lower portion and at least one axial actuator is connected between the lower mounting bracket and the upper portion.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3A is a perspective view of the steering column assembly in an extended position;

FIG. 3B is a perspective view of the steering column assembly in a retracted position;

DETAILED DESCRIPTION

Figure 1:
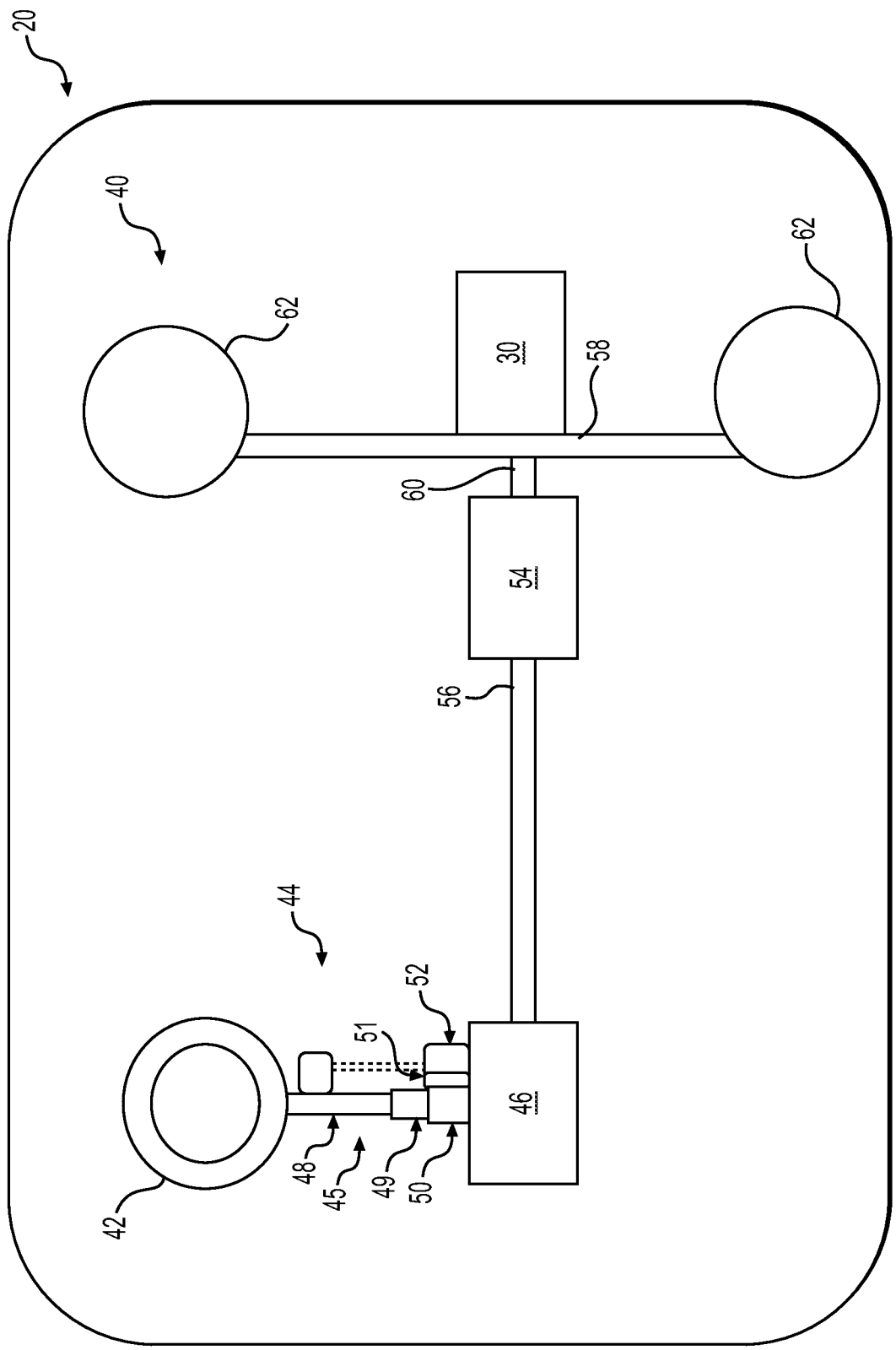
FIG. 1 generally illustrates a vehicle with a steering system according to the principles of the present disclosure.

The following discussion is directed to various embodiments of the disclosure. Although one or more of these embodiments may be described in more detail than others, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions. In the past, a function of axially adjustable steering columns was to provide flexibility in the location of the hand wheel and facilitate more comfortable driving positions for different sizes of drivers. However, now there are opportunities for significantly more telescopic travel, which also may be referred to as stow travel (i.e., when the hand wheel is not needed). For example, the hand wheel could be repositioned completely away from the driver to allow him or her to do things other than operate the vehicle, such as work on a laptop computer when the vehicle is parked. Other examples include vehicles with autonomous driving capability, such that the hand wheel could be stowed when the vehicle is in an autonomous driving mode. For a significantly greater amount of telescopic and stow capacity, conventional steering column solutions will not package between the rear of dash and the front of dash for any normal passenger vehicle.

Referring now to the drawings, where the various embodiments are shown and described herein, without limiting same, FIGS. 1-6 illustrate embodiments of a steering column assembly that is axially adjustable with improved packaging and other operational benefits. The axial adjustability can result from relative movement between two or more steering column portions (e.g. jackets, brackets, rails, and/or the like) that permit axial movement there between. For example, a first portion and a second portion that adjust in a relative telescopic, sliding, or translational movements.

Referring initially to FIG. 1, a vehicle 20 is generally illustrated according to the principles of the present disclosure. The vehicle 20 may include any suitable vehicle, such as a car, a truck, a sport utility vehicle, a mini-van, a crossover, any other passenger vehicle, any suitable commercial vehicle, or any other suitable vehicle. While the vehicle 20 may be a passenger vehicle having wheels and for use on roads, the principles of the present disclosure may apply to other vehicles, such as planes, tractors, boats, or other suitable vehicles. The vehicle 20 may include a propulsion system 30, such as an ignition system, an electronic system, or combinations thereof.

In some embodiments, the vehicle 20 may further include a steering system 40. The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. A steering column assembly 44 includes a steering column 45 that extends along an axis from the input device 42 to a output assembly 46. The output assembly 46 may include a pinion shaft assembly, an I-shaft, a cardan joint, steer-by-wire components or any feature conventionally located opposite the input device 42.

The steering column 45 may include at least two axially adjustable portions, for example, a first portion 48 and a second portion 50 that are axially adjustable with respect to one another. The at least two axially adjustable portions may further include at least one third portion 49 that is disposed between the first portion 48 and the second portion 50. The first portion 48, the second portion 50, and the third portion 49 may be configured as jackets, brackets, rails, other devices, or combinations thereof. The axial movement may include sliding, telescopic, translating, other axial movements, or combinations thereof. The steering column assembly 44 may include a component 51, such as a mounting bracket, a power assist housing, an output assembly, a steering gear assembly, a body-in-white structure, and/or another component other than the portions 48, 49, 50. An axial actuator 52 may be connected between the component 51 and one of the first portion 48 and the third portion 49 to provide axial adjustment there between.

The steering column 45 is moveable between a range of positions from an extended position (FIG. 3A) to a retracted position (FIG. 3B). In the extended position, the first portion 48 and/or third portion 49 is moved axially with respect to the second portion 50 so that the input device 42 is located near an operator of the vehicle. In the retracted position, the first portion 48 and/or third portion 49 is moved axially with respect to the second portion 50 so that the input device 42 is located further away from an operator of the vehicle, when compared to the extended position. In some embodiments, the retracted position may correspond to stowing the input device 42. For example, it may be beneficial to place the input device 42 in a stowed location during autonomous driving. In operation, the axial actuator 52 effectuates axial movement between the first portion 48, the third portion 49, and the second portion 50 to adjust between the extended position, the retracted position, and any intermediary positions.

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear and/or various traditional components. The output shaft 60 is operably connected to the steering gear assembly 54 such that a rotation of the steering gear input shaft 56 causes a responsive movement of the output shaft 60 and causes the drive axle to turn wheels 62.

Figure 2:
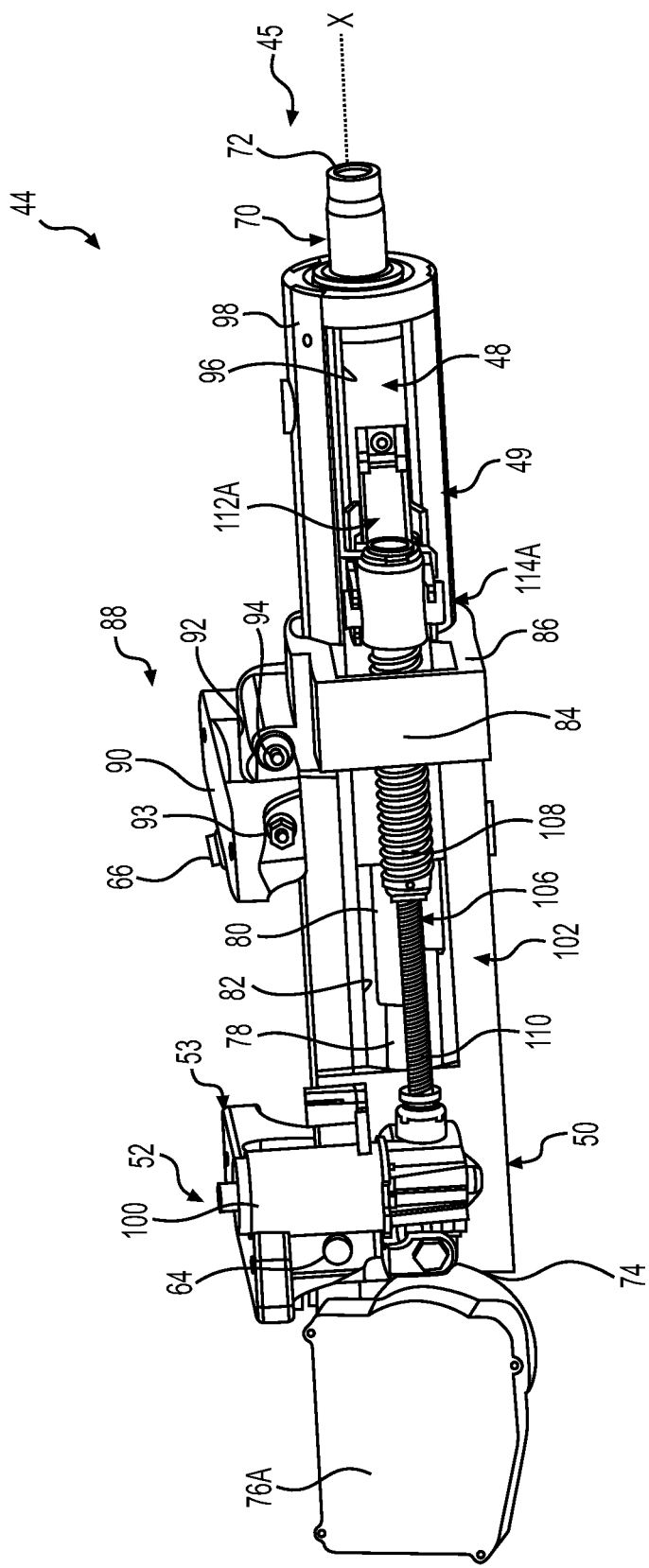
FIG. 2 is a perspective view of a steering column assembly including a steering column extending along a longitudinal axis.

With reference now to FIG. 2, the steering column assembly 44 is generally illustrated. The steering column 45 may be connected to the vehicle component 51, illustrated herein as a bracket 53. The bracket 53 may be a mounting bracket (e.g. a lower mounting bracket) and include a bracket pivot connection 64 for allowing rake or tilt movement of the steering column 45. The steering system 40 may further include a rake actuator 66 for setting a rake position and the axial actuator 52 for moving the first portion 48, the third portion 49, and the second portion 50 relative to one another axially. In some embodiments, the first portion 48 is an upper portion, the third portion 49 is a middle portion, and the second portion 50 is a lower portion. In some embodiments, the first portion 48 may be telescopically received by the third portion 49 and third portion 49 may be telescopically received by the second portion 50.

The steering column 45 includes a steering shaft 70 and extends therewith along a longitudinal axis X. The steering column 45 extends between a first end 72 (e.g. upper end) and a second end 74 (e.g. a lower end). In some embodiments, the input device 42, such as a steering wheel, is operably connected to an upper end of the steering shaft 70 and the output assembly 46 is operably connected to a lower end of the steering shaft 70. The axial actuator 52 may connect to the bracket 53 and extend to the first portion 48. As such, the first portion 48 and the third portion 49 may be actuated between forces acting directly between the bracket 53 and the first portion 48, such that the second portion 50 and the third portion 49 effectively float. A power assist housing 76A may be operably connected to the steering column 45 (e.g. the second portion 50). The steering shaft 70 may include two or more slidable members, for example, an inner member 78 and an outer member 80 that axially extend and retract with the portions (48, 49, 50). The inner member 78 may be axially movable within the outer member 80, for example, via intermeshed splined surfaces (not shown).

With continued reference to FIG. 2, the second portion 50 may be configured as a semi-enclosed tube. More particularly, the second portion 50 may include an outer window 82 that extends along a section of the second portion 50 to a support 84 that extends across the outer window 82. The support 84 may extend radially outwardly from the first portion 50 by a pair of footing portions 86. The window 82 and the footing portions 86 may permit movement of the axial actuator 52 therealong. The bracket 53 is connected to the second portion 50 near the second end 74 and an upper mounting bracket 88 may be connected near an opposite end of second portion 50 in axial alignment with the support 84 on the axis X. The upper mounting bracket 88 may include a rake bracket 90 and a pivot body 92. In use, the rake bracket 90 connects to a portion of the vehicle 20 and the pivot body 92 connects to the rake bracket 90 at a first rake pivot point 93 and the second portion 50 at a second rake pivot point 94. The first rake pivot point 93 and the second rake pivot point 94 are spaced such that pivoting movement of the pivot body 92 with respect to the first rake pivot point 93 results in rake or tilting movement of the steering column 45.

The third portion 49 may also be configured as a semi-enclosed tube. More particularly, the third portion 49 includes an inner window 96 that extends along the axis X along a section of the third portion 49. The third portion 49 may further include cam plates 98 that make slidable contact with an inner surface of the second portion 50. The cam plates 98 may be disposed circumferentially about the third portion 49. For example, there may be three cam plates 98 each disposed every 120° about the axis X. The cam plates 98 may be formed of more durable material than surrounding segments of the third portion 49.

The first portion 48 may be axially connected to a portion of the steering shaft 70 near the first end 72 and axially extend and retract the steering shaft 70 between the retracted and stowed positions. In the retracted position, the first portion 48 is received in the third portion 49 and the third portion 49 is received in the second portion 50. In the extended position, the third portion 49 and the first portion 48 extend outwardly from the second portion 50.

The axial actuator 52 may include a driving unit 100 (e.g. a motor) and a driven unit 102 (e.g. a gear mechanism). The driven unit 102 may include a motor driven lead screw 106 (e.g. directly driven or indirectly via a splined nut and/or the like). The lead screw 106 may include an outer lead screw 108 defining a bore and an inner lead screw 110 received within the bore, wherein the inner lead screw 110 is located in the bore when the axial actuator 52 axially retracts the portions 48, 49, 50 towards the retract position. When the axial actuator 52 axially extends portions 48, 49, 50, the inner lead screw 110 at least partially exits the bore such that the overall length of the lead screw 106 becomes larger. The bore of the outer lead screw 108 and an outer surface of the inner lead screw 110 may both include meshed helical teeth to facilitate axial movement there between. In some embodiments, at least one collar (not shown) is connected between the outer lead screw 108 and the inner lead screw 110 to retain the inner lead screw 110 inside of the outer lead screw 108.

With reference now to FIGS. 2 through 3B, the lead screw 106 extends from the driving unit 100 to a connection bracket 112A that connects the lead screw 106 to the first portion 48. The lead screw 16 may be at least partially aligned with the inner window 92 and the outer window 82. The connection bracket 112A is exposed through the outer window 82 and the inner window 96 and slidable there along. The connection bracket 112A is spaced from a section of the first portion 48 near the second end 74. A screw collar 114A is located on the connection bracket 112A and is intermeshed with teeth on the outer lead screw 108. The connection bracket 112A is located at least partially within the inner window 96 and radially inwardly from the support 84. In the retracted position illustrated in FIG. 3B, the inner lead screw 110 is located within the outer lead screw 108 and the screw collar 114A is located on a first end of the outer lead screw 108. During expansion, the driving unit 100 turns the inner lead screw 110 causing the relative rotation and axial movement between the outer lead screw 108 and the inner lead screw 110. During expansion, the screw collar 114A is moved towards a second end of the outer lead screw 108 opposite the first. FIG. 3A illustrates the steering column assembly 44 in a partially extended state, however, it should be appreciated that further actuation will result in additional axial extension of the first portion 48 via movement of the connection bracket 112A through the inner window 96 towards the first end 72. In some embodiments, the actuator 52 may connect to the connection bracket 112A with a first actuator articulation connection 116A. For example, the connection bracket 112A includes at least one ear bracket 115A (e.g. a pair) extending therefrom that define an opening for pivotally retaining the screw collar 114A. More particularly, the screw collar 114A may include one or more actuator pins 117A extending therefrom into the opening of the ear brackets 115A. In some embodiments, the first actuator articulation connection 116A may include a spherical joint that provides articulation in multiple directions or another type of articulation joint.

Figure 4:
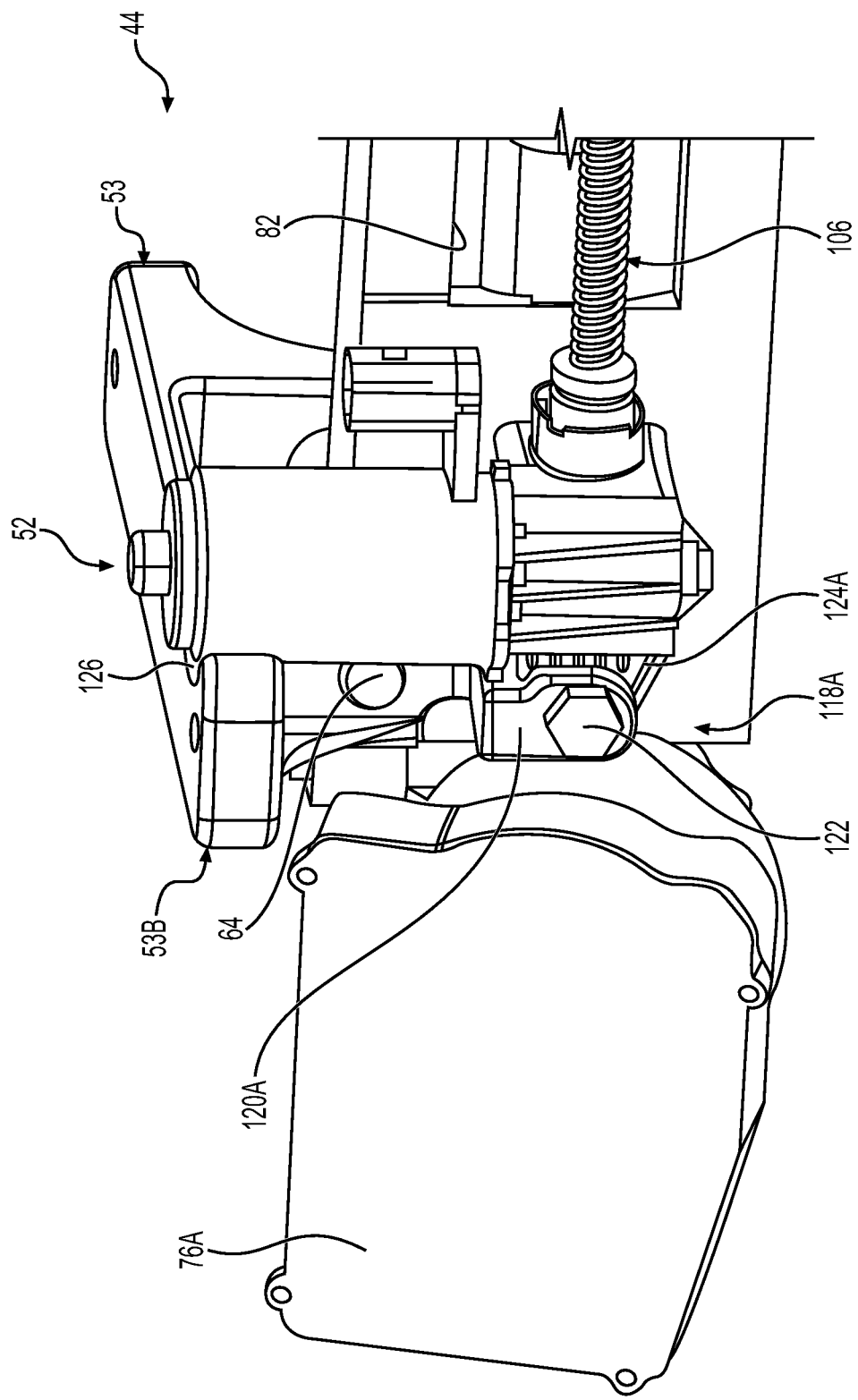
FIG. 4 is an enlarged side view of the steering column assembly illustrating an axial actuator for expanding and retracting two or more axially adjustable portions along the longitudinal axis.

As best illustrated in FIG. 4, the axial actuator 52 may connect to the bracket 53 with a second actuator articulation connection 118A which may be parallel or perpendicular to the first actuator articulation connection 116A. For example, the bracket 53 may include at least one knuckle 120A (e.g. a pair of knuckles) and a pin 122 may extend through each of the knuckles 120A to form the second actuator articulation connection 118A. The axial actuator 52 may include a connection portion 124A with an aperture (not shown) for placement of the pin 122. The knuckles 120A may be located near the bracket pivot connection 64. The bracket pivot connection 64 may be parallel to the first rake pivot point 93 and the second rake pivot point 94 and the bracket pivot connection 64 may be parallel to the second actuator articulation connection 118A and either parallel or perpendicular to the first actuator articulation connection 116A. The first and second actuator articulation connections 116A, 118A permit the actuator 52 to operate at different angles. For example, an angle between the axis X and the lead screw 106 may vary between positions, wherein the angle becomes greater as the steering column 45 is retracted. The bracket 53 defines an actuator contour 126 for permitting portions of the axial actuator 52 (e.g. the driving unit 100) to move with respect to the bracket 53. In some embodiments, the second actuator articulation connection 118A may include a spherical joint that provides articulation in multiple directions or another type of articulation joint.

Figure 5:
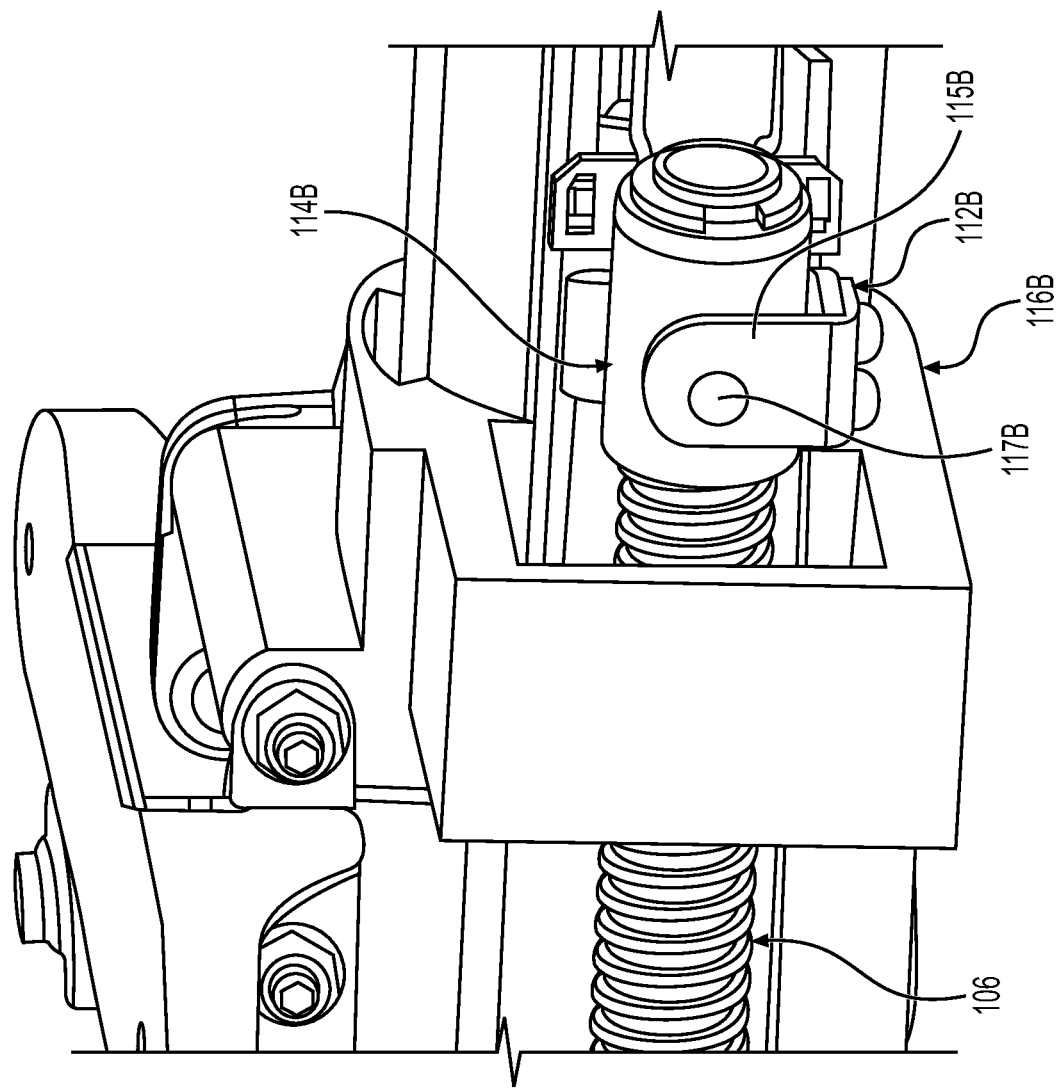
FIG. 5 is a side view of the axial actuator connected to the steering column in accordance with another arrangement.

FIG. 5 is an alternative arrangement wherein the connection bracket 112B and the screw collar 114B include a modified connection to form the first actuator articulation connection 116B. More particularly, the connection bracket 112B may be located in the same general location on the first portion 48 and include at least one ear bracket 115B (e.g. a pair) extending therefrom that define an opening for pivotally retaining the screw collar 114B. More particularly, the screw collar 114B may include one or more actuator pins 117B extending therefrom into the opening of the ear brackets 115B. In this arrangement, the first actuator articulation connection 116B may be parallel to the bracket pivot connection 64, the first rake pivot point 93, and the second rake pivot point 94. In some embodiments, the first actuator articulation connection 116B may include a spherical joint that provides articulation in multiple directions or another type of articulation joint.

Figure 6:
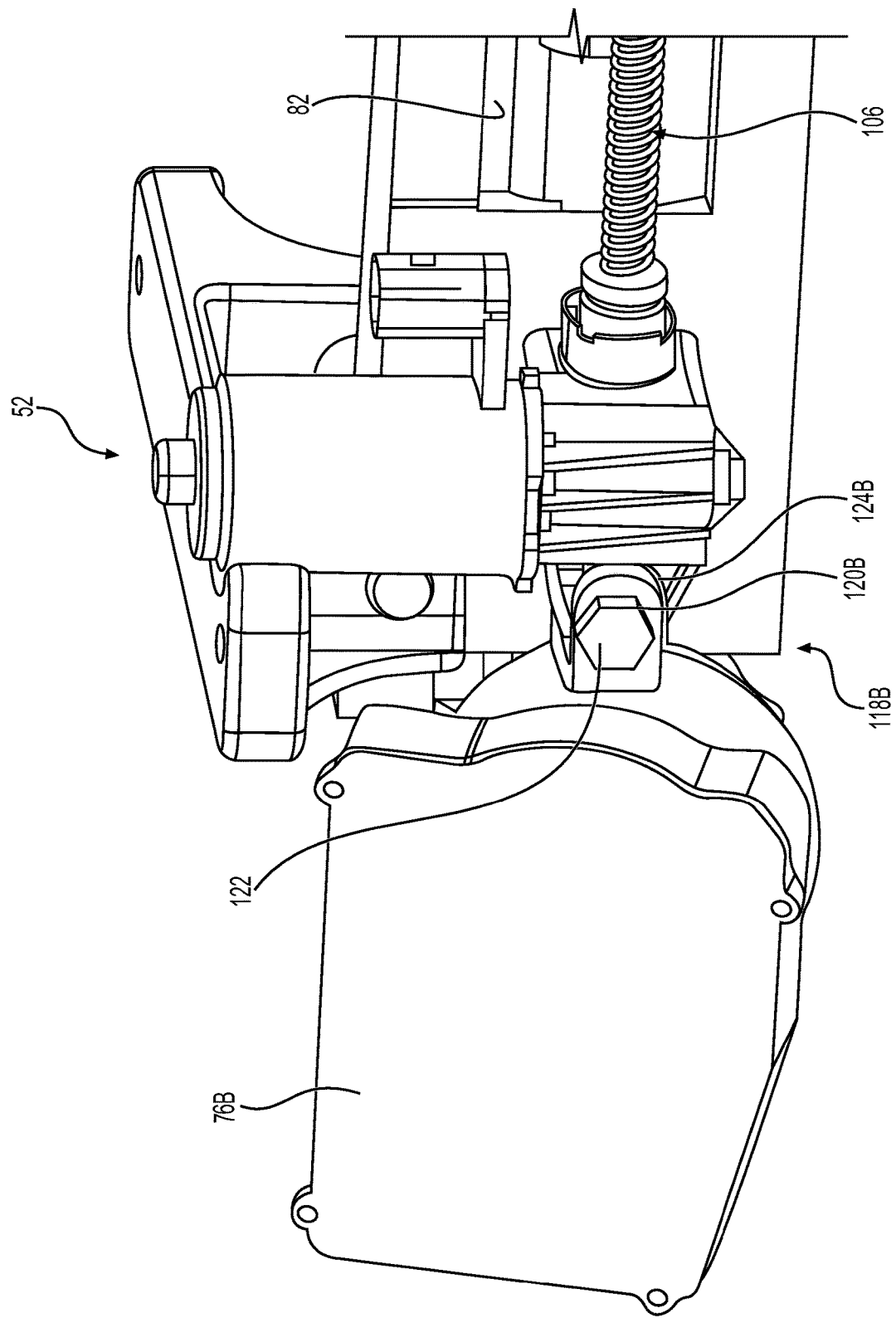
FIG. 6 is a side view of the axial actuator connected to the steering column in accordance with yet another arrangement.

FIG. 6 is an alternative arrangement wherein the wherein the component 51 is configured as a power assist housing 76B having a modified configuration. More particularly, the power assist housing 76B includes a second actuator articulation connection 118B that may be parallel to the bracket pivot connection 64, the first rake pivot point 93, and the second rake pivot point 94. More particularly, the power assist housing 76B includes at least one knuckle 120B (e.g. a pair of knuckles 120B) and a pin 122 extending through the at least one knuckle 120B to form the second actuator articulation connection 118B. The axial actuator 52 may include a connection portion 124B with an aperture (not shown) for placement of the pin 122. It should be appreciated that this arrangement may utilize either of the afore described first actuator articulation connections 116A, 116B. In some embodiments, the second actuator articulation connection 118B may include a spherical joint that provides articulation in multiple directions or another type of articulation joint.

While the invention has been described in detail in connection with only a limited number of embodiments, it is to be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Moreover, any feature, element, component or advantage of any one embodiment can be used on any of the other embodiments. Accordingly, the invention is not to be seen as limited by the foregoing description.

Having thus described the invention, it is claimed:

1. A steering column assembly, comprising:
    a steering column extending along a longitudinal axis between a first end and a second end;
    the steering column including a lower portion extending from the second end, a middle portion connected to and axially moveable with respect to the lower portion, and an upper portion connected to and axially moveable with respect to the middle portion and extending towards the first end;
    a component connected to the steering column adjacent to the lower portion; and
    at least one axial actuator connected between the component and the upper portion;
    a steering shaft, wherein the component effectuates movement of the steering shaft and includes one of a mounting bracket or a steering assist housing;
    wherein the axial actuator is connected to the upper portion with a first actuator articulation connection;
    wherein the first actuator articulation connection includes a connection bracket fixed to the upper portion and the axial actuator is pivotally connected to the connection bracket with at least one actuator pin.

2. The steering column assembly of claim 1, wherein the connection bracket includes at least one ear bracket defining an aperture for receiving the at least one actuator pin.

3. The steering column assembly of claim 1, wherein the middle portion includes an inner window and the lower portion includes an outer window, and wherein the connection bracket slides within the inner widow and the outer window during axial movement of the steering column.

4. The steering column assembly of claim 3, wherein the axial actuator includes a lead screw at least partially aligned with the inner window and the outer window.

5. The steering column assembly of claim 1, wherein the axial actuator is connected to the component with a second actuator articulation connection.

6. The steering column assembly of claim 5, wherein the first actuator articulation connection and the second actuator articulation connection are oriented parallel to each other.

7. The steering column assembly of claim 5, wherein the component includes a mounting bracket.

8. The steering column assembly of claim 5, wherein the component includes a power assist housing.

9. A steering column assembly, comprising:
    a steering column extending along a longitudinal axis between a first end and a second end;
    the steering column including a lower portion extending from the second end, a middle portion connected to and axially moveable with respect to the lower portion, and an upper portion connected to and axially moveable with respect to the middle portion and extending towards the first end;
a component connected to the steering column adjacent to the lower portion; and
at least one axial actuator connected between the component and the upper portion; and
a steering shaft, wherein the component effectuates movement of the steering shaft and includes one of a mounting bracket or a steering assist housing;
wherein the axial actuator is connected to the upper portion with a first actuator articulation connection;
wherein the axial actuator is connected to the component with a second actuator articulation connection;
wherein the first actuator articulation connection and the second actuator articulation connection are oriented perpendicular to each other.

10. A steering column assembly, comprising:
a steering column extending along a longitudinal axis between a first end and a second end;
the steering column including a lower portion extending from the second end, a middle portion connected to and axially moveable with respect to the lower portion, and an upper portion connected to and axially moveable with respect to the middle portion and extending towards the first end;
a component connected to the steering column adjacent to the lower portion; and
at least one axial actuator connected between the component and the upper portion; and
a steering shaft, wherein the component effectuates movement of the steering shaft and includes one of a mounting bracket or a steering assist housing;
wherein the axial actuator is connected to the upper portion with a first actuator articulation connection;
wherein the axial actuator is connected to the component with a second actuator articulation connection;
wherein the component includes a mounting bracket;
wherein the second actuator articulation connection includes at least one knuckle extending from the mounting bracket and the axial actuator is pivotally connected to the at least one knuckle with at least one pin.

11. The steering column assembly of claim 10, wherein the mounting bracket is connected to the lower portion with a bracket pivot connection that permits tilt movement of the steering column.

12. A steering column assembly, comprising:
a steering column extending along a longitudinal axis between a first end and a second end;
the steering column including a lower portion extending from the second end, a middle portion connected to and axially moveable with respect to the lower portion, and an upper portion connected to and axially moveable with respect to the middle portion and extending towards the first end;
a component connected to the steering column adjacent to the lower portion; and
at least one axial actuator connected between the component and the upper portion; and
a steering shaft, wherein the component effectuates movement of the steering shaft and includes one of a mounting bracket or a steering assist housing;
wherein the axial actuator is connected to the upper portion with a first actuator articulation connection;
wherein the axial actuator is connected to the component with a second actuator articulation connection;
wherein the component includes a power assist housing;
wherein the second actuator articulation connection includes at least one knuckle extending from the power assist housing and the axial actuator pivotally connects to the at least one knuckle with at least one pin.

13. A steering column assembly, comprising:
a steering column extending along a longitudinal axis between a first end and a second end;
the steering column including a lower portion extending from the second end, a middle portion connected to and axially moveable with respect to the lower portion, and an upper portion connected to and axially moveable with respect to the middle portion and extending towards the first end;
a component connected to the steering column adjacent to the lower portion; and
at least one axial actuator connected between the component and the upper portion;
wherein the axial actuator includes a lead screw;
wherein the lead screw includes an outer lead screw and an inner lead screw, the inner lead screw received within a bore of the outer lead screw.

* * * * *